United States Patent [19]
Swartz et al.

[11] Patent Number: 6,023,971
[45] Date of Patent: *Feb. 15, 2000

[54] ANGLE SENSOR AND MONITORING CIRCUIT

[76] Inventors: Harold L. Swartz; Jane E. Anderson, both of P.O. Box 1053, Springerville, Ariz. 85938

[*] Notice: This patent issued on a continued prosecution application filed under 37 CFR 1.53(d), and is subject to the twenty year patent term provisions of 35 U.S.C. 154(a)(2).

[21] Appl. No.: 08/941,372

[22] Filed: Sep. 30, 1997

[51] Int. Cl.[7] ............................. G01F 1/56; G01F 23/22
[52] U.S. Cl. ............................. 73/304 R; 73/301; 33/366
[58] Field of Search ............................. 73/290 R, 304 C, 73/304 R, 301; 33/366

[56] References Cited

U.S. PATENT DOCUMENTS

| | | | |
|---|---|---|---|
| 4,628,612 | 12/1986 | Hori et al. | 33/366 |
| 4,733,560 | 3/1988 | Dam | 73/304 C |
| 5,726,908 | 3/1998 | Hosmer et al. | 73/304 C |
| 5,747,689 | 5/1998 | Hampo et al. | 73/304 C |
| 5,802,728 | 9/1998 | Karnick et al. | 33/366 |

*Primary Examiner*—Max Noori
*Attorney, Agent, or Firm*—Brinks Hofer Gilson & Lione

[57] ABSTRACT

A cross axis acceleration or roll angle insensitive angle sensor is constructed as a tubular body defining a closed tubular chamber with annular sensing plates soldered to each end. The tubular chamber is partially filled with partially electrically conductive liquid such that the resistance between the annular sensing plates and the tubular body is a function of the immersed area of the sensing plates. A variation in the inclination of the sensor causes a corresponding variation in the fluid level on the surface of the sensing plates and thus a variation in the electrical resistance between each sensing plate and the tubular body. The monitoring circuit for the angle sensor comprises a detecting means for sensing variations of the resistance between each sensing plate and provides an indication of any deviation from level position of the fluid within the tubular chamber.

20 Claims, 2 Drawing Sheets

ANGLE SENSOR AND MONITORING CIRCUIT

FIELD OF THE INVENTION

The present invention relates generally to a angle sensor and, more particularly, to an improved fluid-based angle sensor in which resistance elements are used to render readings insensitive to cross axis rotation or acceleration.

BACKGROUND OF THE INVENTION

Various angle sensors are known in the prior art and typically comprise fluid filled electrolytic or capacitive devices such as clinometers or accelerometers. These sensors are particularly well adapted for calculating tilt angles but are also sensitive to cross axis rotation or acceleration.

The sensor of the present invention, with its pair of spaced, annular shaped, electrical resistance elements, has the advantage that the tilt angle of an object can be precisely measured without regard to the rotational angle of the object. In the drilling field, this is useful for maintaining a desired percent of grade in order to prevent re-boring. For instance, the angle sensor as described in the present invention could be used to measure the drill head pitch angle while the drill head rotates 360 degrees in roll.

SUMMARY OF THE INVENTION

The present invention relates to an angle sensor comprising a tubular body with sensing plates soldered to each end defining a closed tubular chamber. The sensing plates, according to the present invention, are arranged with an annular electrical resistance element fixed to the flat surface of each sensing plate. The electrical resistance elements are generally circular in shape and are fixed to the inner surface of each sensing plate.

The tubular chamber is partially filled with partially electrically conductive liquid, such that the resistance between the sensing plates is a function of the immersed surface area of the annular resistance elements. A variation in the inclination of the sensor causes a corresponding variation in the fluid level on each surface of the resistance elements and thus a variation in the electrical resistance between each resistance element.

The electrical resistance elements at opposing ends of the tubular chamber are connected in a monitoring circuit with the element from each end connected to a detecting means for sensing variations of the resistance between each resistance element and the metallic tubular chamber. The detecting means provides an indication of any deviation from level position of the fluid within the tubular chamber. In the preferred embodiment, the detecting means comprises a microprocessor with an analog-to-digital converter, an error correcting means, and LCD drivers for numerical display of the variable resistance being measured. The annular shape of the resistance elements essentially eliminates any variation of measured resistance during rotation of the angle sensor. Thus, the pitch angle signal is displayed without regard to the rotational angle of the angle sensor.

Accordingly, an important object of the present invention is to provide a angle sensor for monitoring the tilt angle of an object without regard to the rotational angle of the sensor which is reliable and inexpensive.

Still another important object of the present invention is to provide a monitoring circuit for displaying the tilt angle of the sensor without regard to the rotational angle of the sensor.

These and other aspects and advantages of the invention are described or apparent from the following detailed description of the preferred embodiment and appended drawings wherein like reference numbers refer to the same element, feature or component.

BRIEF DESCRIPTION OF THE DRAWINGS

The preferred embodiments are described with reference to the drawings in which.

DESCRIPTION OF THE PREFERRED EMBODIMENTS

The present invention will now be more particularly described with reference to the drawings.

Figure 1:
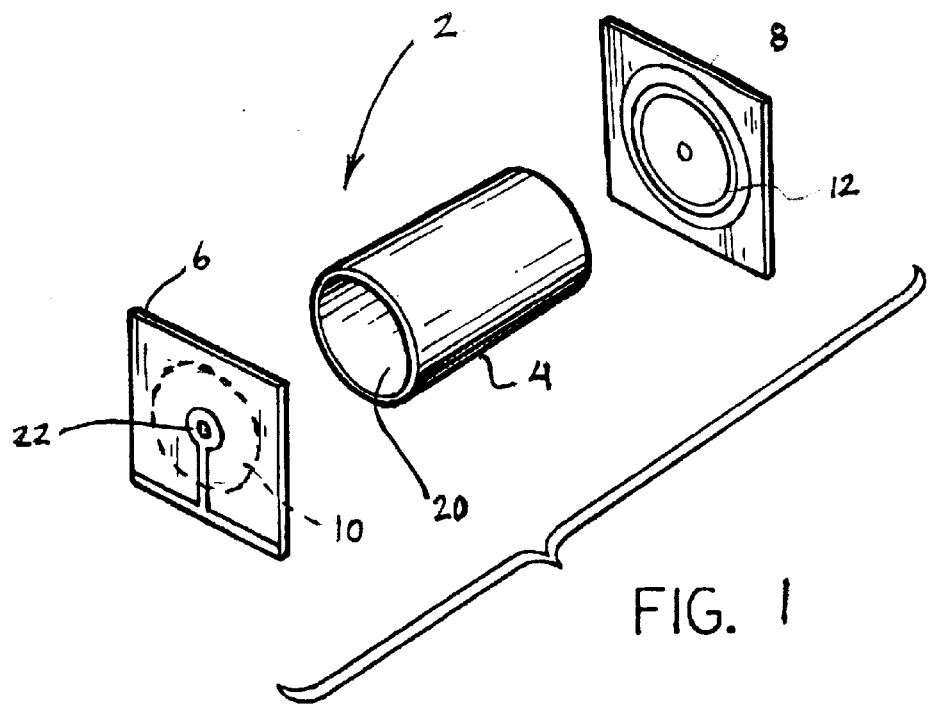
FIG. 1 shows an exploded perspective view of the angle sensor according to the preferred embodiment of the invention.

Referring first to FIG. 1, an angle sensor 2 according to the invention includes a tubular body 4 and two sensing plates 6 and 8 joined to each end of body 4 defining a closed tubular chamber 20. The sensing plates 6 and 8, in the embodiment illustrated, are relatively thin and may be made from ceramic or other insulating materials.

Figure 2:
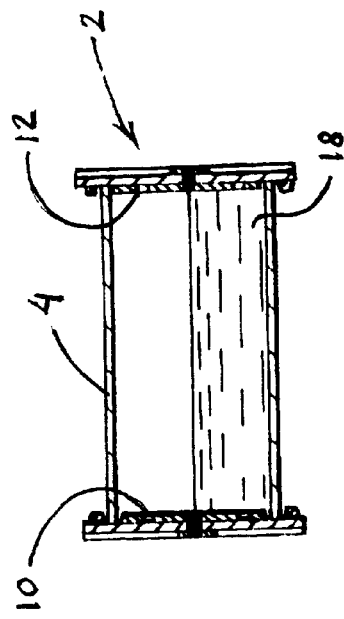
FIG. 2 shows a cross-sectional view of the angle sensor shown in FIG. 1.

As is apparent in particular from FIGS. 1 and 2, two annular electrical resistance elements 10 and 12 are applied to the inner face of the sensing plates 6 and 8 respectively. The resistance elements 10 and 12 are placed on the sensing plates 6 and 8 so that they face each other when the sensing plates 6 and 8 are joined to the tubular body 4.

The resistance elements 10 and 12 are generally circular in shape and act as variable resistors electrically interconnected to external circuits. The diameter of the electrical resistance elements 10 and 12 is slightly less than the diameter of the tubular body 4 so that each electrical resistance element 10 and 12 fit within the end openings of the tubular body 4 without shorting to the tubular body 4.

The chamber 20 is partially filled with partially electrically conductive liquid 18 through a hole 22 which may be formed in the sensing plate 6 and/or 8. The hole 22 is then sealed, for example, by using an epoxy resin or solder. The quantity of partially electrically conductive liquid introduced into the chamber 20 is such as not to fill the chamber 20 completely as indicated in FIG. 2 so that if the angle sensor 2 is oriented with the tubular body 4 in the horizontal position, the liquid 18 is disposed equally between the surface area of the resistance elements 10 and 12. In this condition, the electrical resistance measurable by the resistance elements 10 and 12 to the tubular body 4 is substantially equal.

An inclination of the sensor 2 causes a corresponding variation in the fluid level on the surface area of the resistance elements 10 and 12 and thus a variation in the electrical resistance measured between each resistance element 10 and 12 and the tubular body 4. The embodiment illustrated in FIGS. 1 and 2 allows the inclination of the sensor to be detected solely with respect to the horizontal axis as a result of the annular surface of the resistance elements 10 and 12. For example, if the sensor 2 is rotated about its horizontal axis, the surface area of the resistance elements 10 and 12, covered by the fluid 18, remains substantially unchanged. Thus, it is possible to form a sensor which can detect inclination with respect to the horizontal reference plane without regard to the rotational angle of the sensor.

The sensor 2 described above is connected with a bridge circuit to detect the variations in resistance between the resistance elements 10 and 12 and the tubular body 4 and hence the inclination of the sensor 2.

Figure 3:
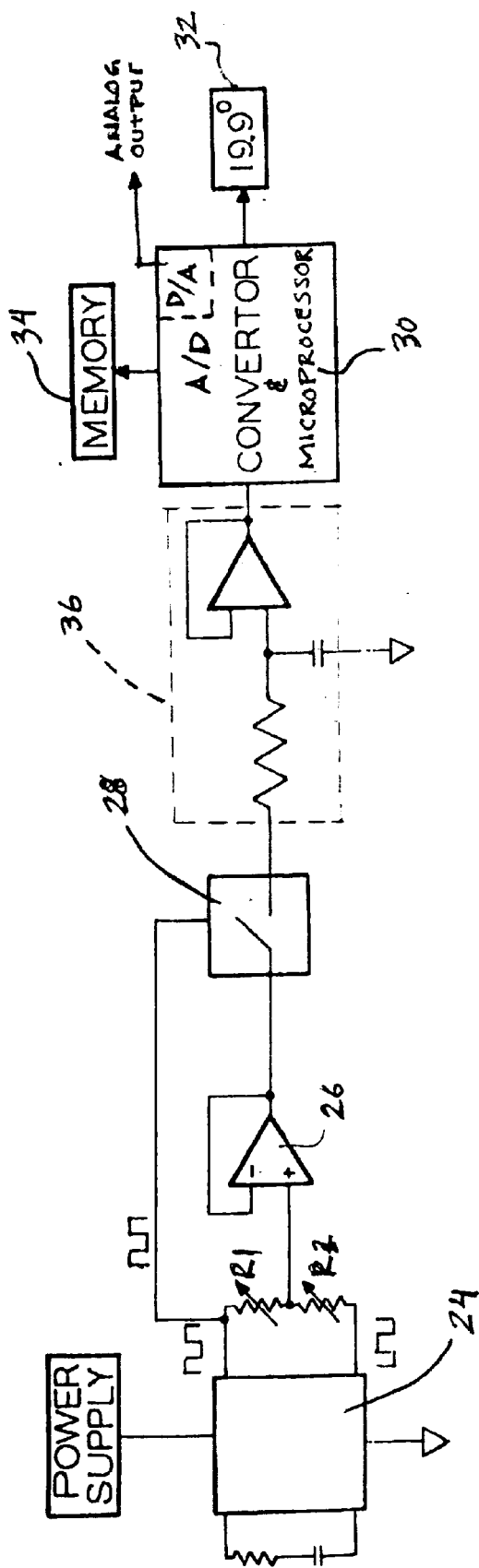
FIG. 3 shows a detailed electrical diagram of a monitoring circuit for detecting and measuring the pitch angle of the sensor shown in FIG. 1.

FIG. 3 shows one possible circuit usable for this purpose. The resistance elements 10 and 12 are indicated as variable resistors R1 and R2 respectively, the resistance varying in accordance with the inclination of the sensor 2 as a result of the change in fluid level along the surface area of the resistance elements 10 and 12 as described above. An oscillator, denoted by numeral 24, is arranged to output two 0–5 volt square wave signals in counterphase. The oscillator voltage output of oscillator 24 is fed through the variable resistors R1 and R2 which form a voltage divider bridge combining the two oscillator voltage signals. The sum of these two oscillator voltage signals is indicative of the angle of inclination of the sensor 2. For example: if the sensor 2 is in the level position relative to the horizontal plane, the sum of counterphase oscillator voltage signals from the oscillator 24 are combined in subtractive fashion creating a constant voltage output. As the sensor 2 is inclined, the voltage is a measure of the resulting negative or positive portion of the original square wave voltage signal from the oscillator 24 and hence a resulting negative or positive bias voltage. The resulting combined voltage signal is applied to amplifier 26 which drives switch demodulator 28. After conditioning by the resistance-capacitance filter 36 as shown in FIG. 3, the analog output is fed into the analog-to-digital converter 30 and the digital output is used to drive display drivers (not shown), also housed on the same integrated circuit as converter 30, to energize a display indicating device 32 such as an LCD, LED, CRT, and the like. Display device 32 provides a readout in accordance with the magnitude and direction of inclination of the sensor 2. Memory device 34 stores the main program used by the microprocessor 30 to sample output signals from the filter 36 and to store characterization constants to correct sensor non-linearity errors (or other errors such as temperature errors) used by the microprocessor. The output of the microprocessor 30 can then be converted to a digital output signal via the analog-to-digital converter 30 for display or can be sent to an external sensing device.

Figure 4:
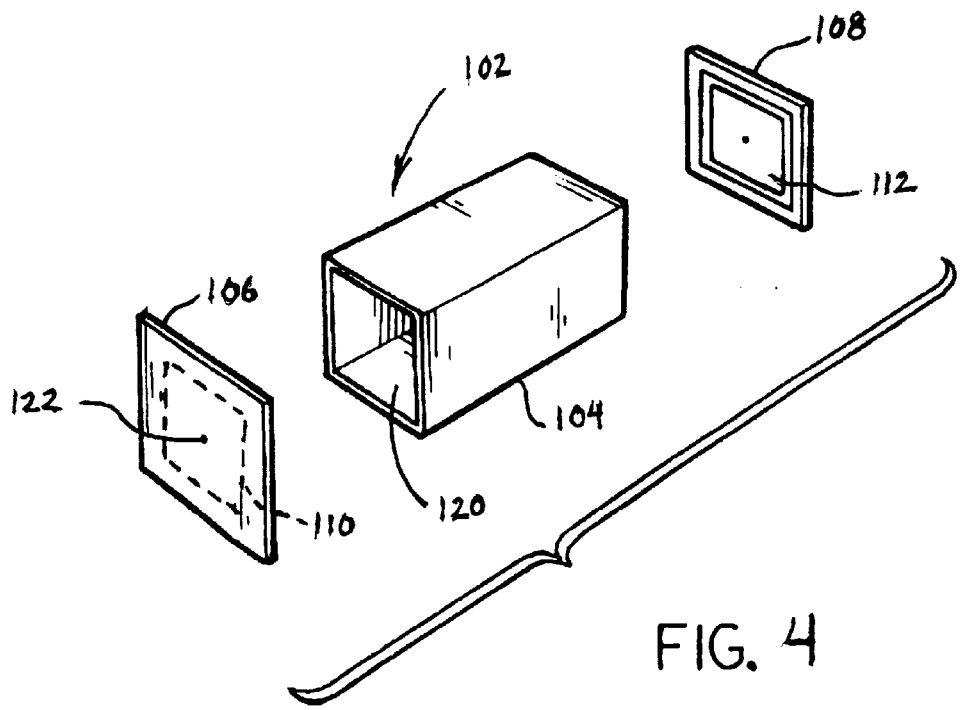
FIG. 4 is a view similar to FIG. 1 illustrating an alternative embodiment of the present invention.

In the alternate embodiment of FIG. 4, elements which generally correspond to elements of FIGS. 1 and 2 are identified by a 100 series numeral, the last two digits of which are the same as the two digits of the corresponding elements of FIGS. 1 and 2. In FIG. 4, the sensor 102 is made up of a generally elongated square body 104 and two sensing plates 106, 108 joined to each end of body 104 defining a closed elongated chamber 120. The resistance elements 110 and 112 are placed on the inner surfaces of the sensing plates 106 and 108 so that they face each other when the sensing plates 106 and 108 are attached to the ends of the elongated body 104.

In the embodiment described in FIG. 4, the resistance elements 110 and 112 are essentially square and act as variable resistors electrically interconnected to an external circuit as shown in FIG. 3. Similar to that described in FIGS. 1 and 2, the elongated chamber 120 is partially filled with partially electrically conductive liquid for measuring the resistance between resistance elements 110 and 112. The generally elongated square body 104 with the sensing plates 106 and 108 forms a sensor 102 which is suitable for detecting angles with respect to a single axis. The square shape of body 104 yields improved linearity at the expense of being roll sensitive.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A rotationally insensitive angle sensor comprising, in combination,
    a hollow body defining an axis and a pair of spaced apart ends on said axis, a first resistance element secured to said body at one of said ends and a second resistance element secured to said body at another of said ends, said body and said ends forming a closed chamber containing a quantity of electrically conductive liquid,
    and a circuit for determine a difference in current flow between said first resistance element and said body and said second resistance element and said body and providing an output representing an angle of inclination of said axis.

2. The rotationally insensitive angle sensor according to claim 1, wherein said first and second resistance elements are circular in shape.

3. The rotationally insensitive angle sensor according to claim 1, wherein said body is generally tubular in shape.

4. The rotationally insensitive angle sensor according to claim 1, further comprising a first sensing plate secured to said first resistance element and a second sensing plate secured to said second resistance element.

5. The rotationally insensitive angle sensor according to claim 4, wherein said first and second sensing plates are formed of an electrically insulating material.

6. The rotationally insensitive angle sensor according to claim 1, wherein said first and second resistance elements are formed of an electrically conductive material.

7. The rotationally insensitive angle sensor according to claim 1, wherein said circuit includes a display device for displaying said angle of inclination of said angle sensor.

8. The rotationally insensitive angle sensor according to claim 1, wherein said first and second resistance elements are generally square in shape.

9. The rotationally insensitive angle sensor according to claim 1, wherein said body forms a generally elongated square chamber.

10. A rotationally insensitive angle sensor comprising, in combination,
    a tubular body having a longitudinal axis and opposed ends;
    a first circular electrical element and a second circular electrical element secured to said ends of said tubular body and forming a chamber, an electrically conductive fluid partially filling said chamber; and
    a circuit for determining a difference in electrical current flow between said first circular element and said tubular body and said second circular element and said tubular body,
    whereby an area of each of said circular elements in contact with said fluid is constant during rotation of said tubular body about said longitudinal axis and varies with inclination of said longitudinal axis.

11. The rotationally insensitive angle sensor according to claim 10, wherein said first and second electrical elements form a voltage divider bridge for responsive output as a function of the orientation of said liquid relative to said axis.

12. The rotationally insensitive angle sensor acccording to claim 10, wherein said first and second circular electrical elements have a diameter slightly less than the diameter of said tubular body.

13. The rotationally insensitive angle sensor according to claim 10, wherein said circuit includes an analog-to-digital converter and a display driver to energize a display indicating device.

14. The rotationally insensitive angle sensor according to claim 13, wherein said indicating device is an LCD.

15. The rotationally insensitive angle sensor according to claim 13, wherein said indicating device is an LED.

16. The rotationally insensitive angle sensor according to claim 13, wherein said indicating device is a CRT.

17. The rotationally insensitive angle sensor according to claim 13, further comprising a memory device for storing a correcting program.

18. The rotationally insensitive angle sensor according to claim 10, further comprising a microprocessor.

19. A rotationally insensitive angle sensor comprising, in combination, a hollow body defining an axis and having a first end defining a first area and a second end defining a second area, a first resistance element secured to said first end of said body and extending substantially over said first area of said first end, a second resistance element secured to said second end of said body and extending substantially over said second area of said second end, and a quantity of electrically conductive liquid disposed within said hollow body, whereby the resistance between said hollow body and each of said resistance elements is constant during rotation of said hollow body about said axis and varies with inclination of said axis.

20. The rotationally insensitive angle sensor of claim 19 further including a circuit for sensing the difference in resistance between said first resistance element and said body and said second resistance element and said body and providing an output representative of such difference.

* * * * *